Nov. 16, 1965  E. D. PETERSON ETAL  3,218,553
TIME INTERVAL MEASURING SYSTEM EMPLOYING VERNIER DIGITAL
MEANS AND COARSE COUNT AMBIGUITY RESOLVER
Filed May 29, 1961  4 Sheets-Sheet 1

INVENTORS:
Elvin D. Peterson
Richard P. Valenti

By Mueller & Aichele
Attorneys

Fig. 3A

United States Patent Office 3,218,553
Patented Nov. 16, 1965

3,218,553
TIME INTERVAL MEASURING SYSTEM EMPLOYING VERNIER DIGITAL MEANS AND COARSE COUNT AMBIGUITY RESOLVER
Elvin D. Peterson, Mesa, and Richard P. Valenti, Phoenix, Ariz., assignors to Motorola, Inc., Chicago, Ill., a corporation of Illinois
Filed May 29, 1961, Ser. No. 113,489
12 Claims. (Cl. 324—68)

The present invention relates to a new and improved system and apparatus for precisely measuring time intervals, and it relates more particularly to an improved system and apparatus for measuring the time interval between a pair of time-spaced pulse signals.

Time interval measuring systems are known in the prior art for measuring the time interval between two discrete pulse signals. These two pulse signals are usually referred to as the "start" pulse and the "stop" pulse. The prior art systems usually fall within two general types, and these respectively incorporate analog techniques or digital techniques.

The present invention is of the general type of system referred to above which are predicated upon digital principles. In the usual prior art digital type of time interval measuring system, the "start" pulse initiates a series of regularly timed pulses and the "stop" pulse terminates the series; and an appropriate pulse counter is used to count the pulses in the series and to express the result as a function of time interval between the "start" pulse and the "stop" pulse.

The accuracy of the prior art digital type of time interval measuring systems is dependent upon the time spacing between the pulses of the series referred to in the preceding paragraph; and this spacing, in turn, is dependent upon the maximum speed at which known types of pulse counters can operate, and also upon the accuracy and discriminating ability of the gate circuits used in the system.

Recent prior art developments in the art of digital time interval measuring systems have resulted in a type of system which utilizes a master oscillator and a vernier oscillator. The vernier oscillator has a slightly different frequency from that of the master oscillator. In this particular prior art system, the number of pulses delivered by the master oscillator is measured; and, when the interval of time to be measured is not an exact multiple of the period of the master oscillator, the vernier oscillator is activated and the number of pulses generated by it in a particular time interval are also measured. The number of pulses delivered by the master oscillator are counted to provide a "units" designation of the time interval, and the number of pulses delivered by the vernier oscillator is counted to provide a "fraction" measurement of the time interval.

In brief, the prior art system described in the preceding paragraph includes a first generator which develops a first series of "coarse" pulses. These coarse pulses are used to measure, for example, the number of microseconds between the start pulse and the stop pulse. This prior art system also includes a second generator which generates a second series of "vernier" pulses. These latter pulses are used to measure, for example, the fraction of one microsecond by which the time interval between the "start" pulse and the "stop" pulse exceeds the number of coarse pulses.

The prior art system under consideration, however, is subject to ambiguities. For example, the case will be considered where the time interval between the start pulse and the stop pulse is almost, but not quite, an exact multiple of one microsecond. For example, the case will be considered where the time interval is, 10.01 microseconds. For such a time interval, the measurement indication of the prior art system may be 9.01 microseconds instead of 10.01 microseconds, due to ambiguities inherent in the system. In like manner, the prior art system is capable of giving a reading of 9.99 microseconds where the time interval is 8.99 microseconds.

An important object of the present invention, therefore, is to provide an improved system of the type described above, but which is conceived and constructed so that the aforementioned reading ambiguities are eliminated.

A more specific object of the invention is to provide such an improved system which includes circuitry for determining the conditions wherein reading errors or ambiguities are likely to occur, and which reacts to such conditions to assure that the correct reading is provided at all times.

A still further object of the invention is to provide such an improved type of time interval measuring system which is capable of measuring the time interval between two timespaced pulses in units and fractions and without reading ambiguities in cases where the fractional reading approaches a unit reading.

Yet another object of the invention is to provide such an improved digital time interval measuring system in which a unit count ambiguity is eliminated in measuring time intervals which are nearly exact multiples of the period of the unit coarse pulse series used in the system.

A still further object of the invention is to provide such an improved digital time interval measuring system which utilizes a coarse oscillator and a vernier oscillator, and in which the frequencies of these oscillators need not be precisely related, and in which the production of reading ambiguities is obviated despite the lack of precision of the relation between the frequencies of the two oscillators.

A feature of the invention is the provision of an improved time interval measuring system which uses simple logic circuitry and elements to provide the correct number of pulses required to measure accurately the time interval between a start and a stop pulse in units and fractions and by which count ambiguities are eliminated, especially as the fractional count approaches a unit count.

Another feature of the invention is the provision of an improved time interval measuring system of the type described above and which includes logic circuitry for automatically eliminating gross measurement errors when the coarse and vernier oscillator periods are not related precisely by the predetermined ratio.

The above and other features of the invention which are believed to be new are set forth with particularity in the claims. The invention itself, however, together with further objects and advantages may best be understood by reference to the following description when considered in conjunction with the accompanying drawings, in which:

Figure 1:
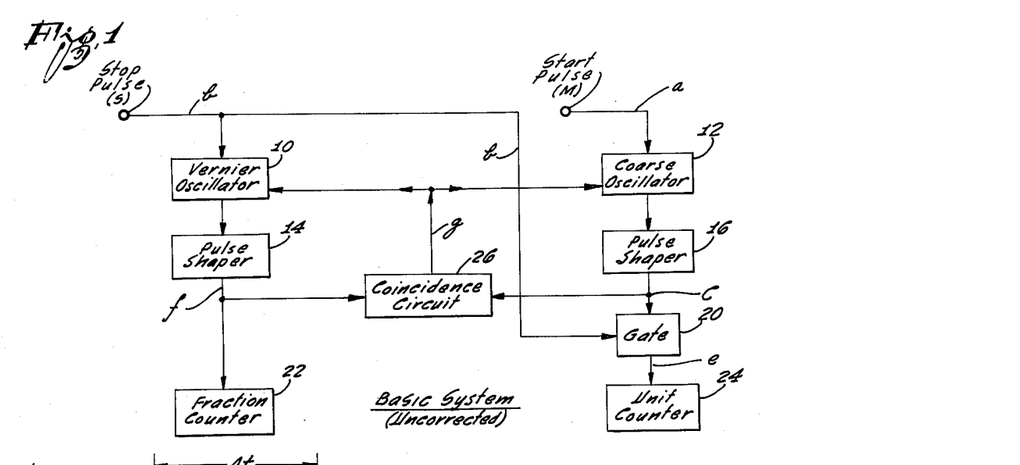
FIGURE 1 is a block diagram of a prior art basic digital system for measuring the time interval between a start pulse and a stop pulse, which does not have the ambiguity correcting features of the present invention but which is useful in explaining the functioning and operation of the system of the invention.

The system of FIGURE 1 includes a vernier oscillator 10 and a coarse oscillator 12. The vernier oscillator 10 is connected to a pulse shaper circuit 14, and the output of the coarse oscillator 12 is connected to a pulse shaper 16. The pulse shaper circuit 16 is coupled to a gate circuit 20. The pulse shaper circuit 14 is connected to a counter network 22 which serves as a "fraction counter," and the gate 20 is coupled to a counter network 24 which functions as a "unit counter."

The pulse shapers 14 and 16 are connected to a coincidence circuit 26, and the output of the coincidence circuit controls the oscillators 10 and 12. The stop pulse S is introduced to the vernier oscillator 10 and to the gate 20. The start pulse M is introduced to the coarse oscillator 12.

Suitable circuits for the various components of FIGURE 1 are well known, and these circuits themselves form no part of the present invention. For that reason, it is believed unnecessary to describe the circuits involved in the various components.

The vernier oscillator 10 is constructed so that it is activated and begins oscillating at the instant it receives the stop pulse S. Likewise, the coarse oscillator 12 is constructed so that it begins oscillating the instant it receives the start pulse M. The frequency of the oscillators 10 and 12 are related in accordance with the ratio $n/n-1$ where $n$ is an integer. The vernier operation by the oscillator 10 may be realized where the frequency of that oscillator is either greater or less than the frequency of the coarse oscillator 12. In the systems to be described $n$ will be assumed to equal 100, to enable microsecond readings to be made in units and tens and in tenths and hundredths.

The oscillators 10 and 12 are assumed to generate sinusoidal output signals, although such a waveform is not necessary. These respective signals are shaped by the pulse shaper circuits 14 and 16, so that they may be transformed into respective series of unidirectional narrow pulses.

The pulse shaper 14 introduces its pulses to the fraction counter 22, and it also introduces its pulse to the coincidence circuit 26. The fraction counter 22 counts the number of pulses passed to it by the pulse shaper 14.

In like manner, the pulse shaper 16 applies its pulses through the gate 20 to the unit counter 24, and it also applies its pulses to the coincidence circuit 26. The coincidence circuit 26 may be a known type of "and" gate. The gate 20 is also normally open, and the unit counter 24 counts the number of pulses passed by it from the pulse shaper 16. The stop pulse S is applied to the gate 20 to close that gate, and the coincidence circuit 26 develops an inhibit output pulse which shuts off and resets both the oscillators 10 and 12.

Figure 2:
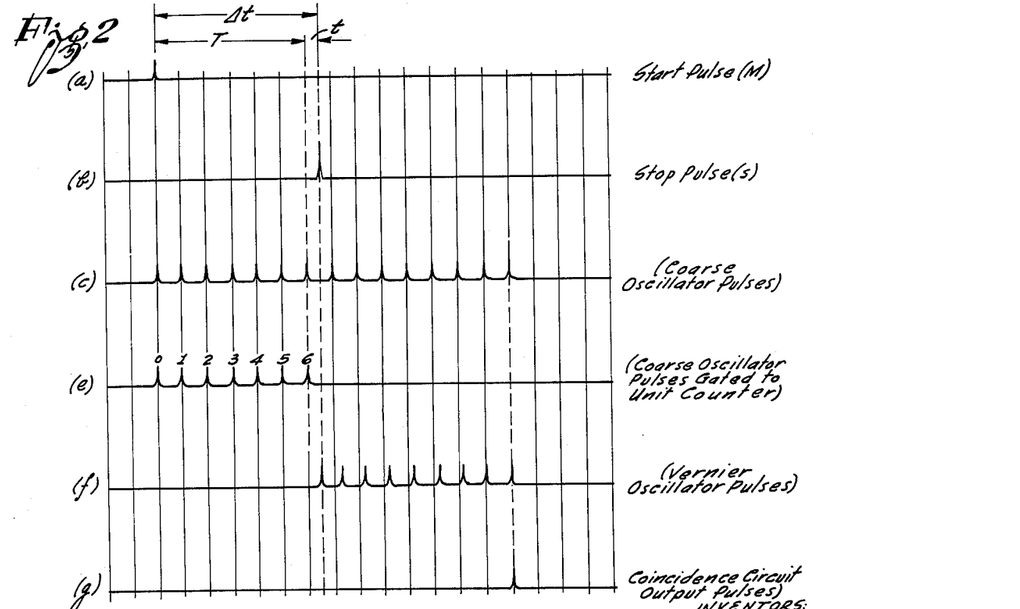
FIGURE 2 is a series of curves useful in explaining the operation of the system of FIGURE 1.

As shown by the curves of FIGURE 2, the start pulse M and the stop pulse S are time-spaced from one another by a time interval $\Delta t$. This time interval is assumed to include a time T which corresponds to an exact multiple of the period of the pulses from the coarse oscillator 12; and an additional interval $t$ which is less than the period of the pulses from the coarse oscillator 12.

At the instant the start pulse M is introduced to the coarse oscillator 12, the pulse shaper 16 begins to generate a series of pulses, such as shown by the curve $c$ in FIGURE 2. These pulses, as noted, have a repetition frequency and period determined by the frequency of the coarse oscillator 12. At the same time, the gate 20 passes the coarse oscillator pulses from the pulse shaper 16 to the unit counter 24. These pulses, as shown in the curve $e$ of FIGURE 2, continue until the gate 20 is closed by the stop pulse S, which is shown in the curve $b$ of FIGURE 2. The unit counter 24, therefore, counts the number of coarse oscillator pulses which occur during the time interval T. However, the interval to be measured is the time interval $\Delta t$, and the unit counter 24 contains no measurement of the additional time $t$ in that interval.

However, in the system of FIGURE 1, the stop pulse S also initiates the vernier oscillator 10, so that the pulse shaper 14 immediately begins to generate a series of vernier oscillator pulses, as shown by the curve $f$ in FIGURE 2. These pulses are displaced in phase from the coarse oscillator pulses developed by the shaper 16. However, because of the difference in frequency between the coarse oscillator pulses and the vernier oscillator pulses, coincidence will occur after a particular number of vernier oscillator pulses. When such coincidence occurs, the coincidence circuit 26 develops an inhibit output pulse, which is shown by the curve $g$ in FIGURE 2. This inhibit pulse from the coincidence circuit 26, as noted above, shuts off and resets the oscillators 10 and 12. Therefore, the vernier oscillator introduces a number of pulses to the fraction counter 22, these pulses beginning with the initiation of the vernier oscillator 10 and terminating at the coincidence point. The fraction counter 22 serves to count the pulses introduced to it by the oscillator 10.

Therefore, in accordance with usual vernier circuit principles, it follows that the unit counter 24 will count the integral number of time intervals T, while the fraction counter 22 will count the fractional number of time intervals $t$ of the total time interval $\Delta t$.

As indicated above, the basic prior art measuring system of FIGURE 1 is susceptible to reading ambiguities, when the time interval between the start pulse and the stop pulse is almost, but not quite, an exact multiple of the unit periods. As also noted, when $n=100$, this is most prevalent when the times to be measured are of the order of microseconds. As pointed out, due to slight misadjustment, when the correct time interval is, for example, 10.01 microseconds; the readout may be 9 or 10 for the units, and 99 or 01 hundredths. Thus readout could be 9.01 or 10.99. The readout could also possibly be 9.99 or 10.01, but the latter does not constitute a gross error.

The principal problem of reading ambiguities arises in the prior art systems since it is impractical to establish pulses and a gate 20 which are sharp as compared with the resolution time of .01 microsecond. The gate circuit 20 has a finite value for the disabling time. Pulses which appear very close to the initiation of the disabling of the gate could slip through before the gate is completely disabled. However, in the system to be described, should the equivalent of the gate 20 be disabled at a time $t_R$ prior to the occurrence of a coarse pulse, and regardless of how close to zero time $t_R$ might be, this is recognized and only the correct number of pulses are allowed to pass the system of the present invention in effect, therefore, provides a gate which can be disabled in zero time. Even with pulses of .02 microsecond wide and of .01 microsecond rise time, there is still a region of uncertainty about .02 microsecond wide. These ambiguities are resolved in the system of the invention, as will now be explained.

Figure 3:
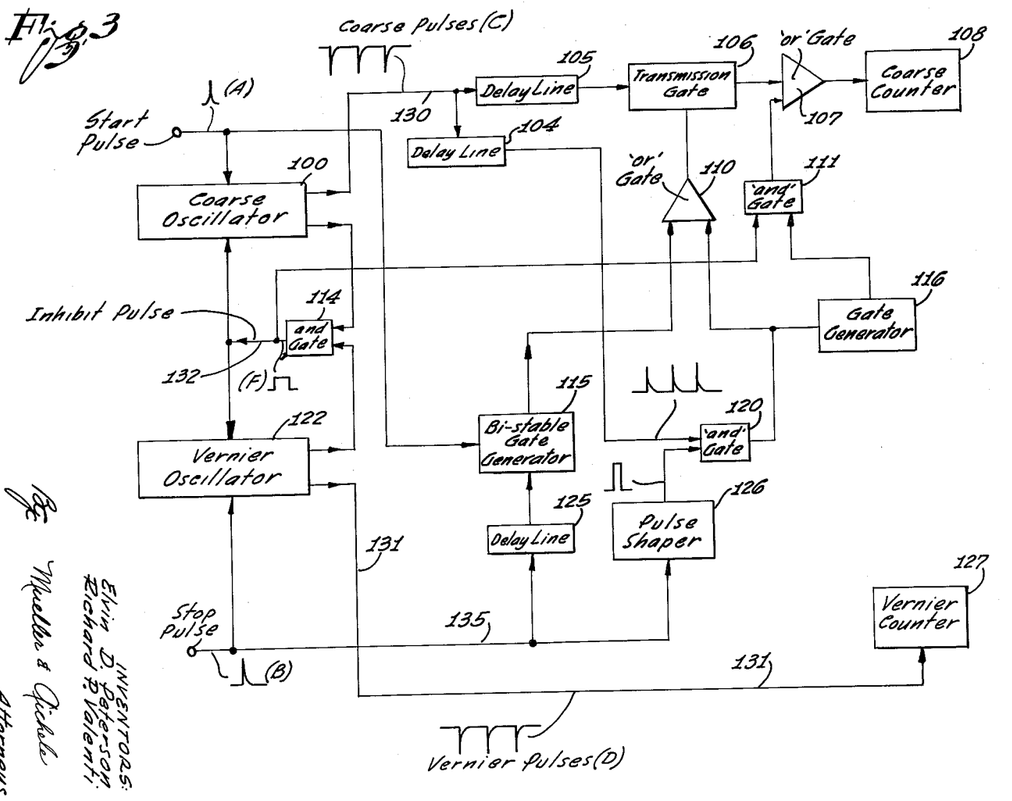
FIGURE 3 is a block diagram of a time measuring system constructed in accordance with one embodiment of the present invention, and which incorporates means for resolving count ambiguities in the system.

The system of FIGURE 3 represents in the block form, one embodiment of the improved system of the invention. Each of the components illustrated in FIGURE 3 is, in itself, extremely well known to the electronic art. For that reason, the specific circuitry of the individual components will not be described. The circuitry may take any of a variety of known forms, and the circuitry per se forms no part of the present invention.

For example, "and" gates, "or" gates, flip-flop networks and counters are described in detail in chapter IV, Analog-Digital Conversion Techniques, Alfred K. Suskind, Dept. of Electrical Engineering, Massachusetts Institute of Technology, published 1957, The Technology Press of Massachusetts Institute of Technology. These networks are also described in chapter 4, Digital Computer Fundamentals, Thomas C. Bartee, Lincoln Laboratory, Massachusetts Institute of Technology, published 1960 by the McGraw-Hill Book Co. Reference is also made to sec. 713, "Circuit Elements for Digital Computers" Electronic Engineers Reference Book, L. E. C. Hughes, published 1958, by the MacMillan Book Company, New York.

The system of FIGURE 3 includes a coarse oscillator 100. The start pulse A is introduced to the coarse oscillator 100, and it causes a series of coarse pulses C to appear on the lead 130 from the output thereof. These coarse pulses continue, until an inhibit pulse is introduced to the coarse oscillator 100. As soon as this inhibit pulse is introduced to the coarse oscillator, the generation of the coarse pulses C is terminated.

The vernier oscillator 122 of FIGURE 3 may include similar components as the coarse oscillator. In like manner, when the stop pulse B is introduced to the vernier oscillator 122, series of vernier pulses D appears on the lead 131 from the output circuit of the vernier oscillator 122. The pulse generation from the vernier oscillator continues until the above mentioned inhibit pulse is applied to the vernier oscillator.

The output pulses from the coarse oscillator 100, and the output pulses from the vernier oscillator 122 are applied to an "and" gate 114. As soon as time coincidence occurs between any one of the coarse pulses from the coarse oscillator 100 and one of the vernier pulses from the vernier oscillator 122, the gate 114 is enabled, and inhibit pulse F appears on the lead 132. This inhibit pulse, as noted above, terminates the operation of both the oscillators 100 and 102.

The coarse pulses C on the lead 130 are introduced to a delay line 104 and to a delay line 105. The delay line 104 is coupled to an "and" gate 120. The "and" gate 120 is coupled to an "or" gate 110 and to a gate generator 116. The delay line 105 is coupled to a normally-open transmission gate 106, and this gate is closed when an output signal from the "or" gate 110 is received.

The gate generator 116 is coupled to the "and" gate 111. The transmission gate 106, and the "and" gate 111 are coupled through an "or" gate 107 to a coarse unit counter 108.

The stop pulse B appears on the lead 135, and it is introduced to a delay line 125 and to a pulse shaper network 126. The vernier pulses D from the vernier oscillator 122 are introduced to a vernier counter 127 over the lead 131. The pulse shaper 126 is connected to the "and" gate 120, and the delay line 125 is connected to a bi-stable gate generator 115, the output terminal of which is connected to the "or" gate 110. The "start" pulses A are applied to the other input terminal of the generator 115.

The system of FIGURE 3 includes coarse and vernier oscillators, as described, which are similar in their function to those described in conjunction with the system of FIGURE 1. The system of FIGURE 3 also contains the basic gating components of the system of FIGURE 1.

When the start pulse A is received, the coarse oscillator 100 is activated. This causes the series of coarse pulses C to appear on the lead 130, and these coarse pulses are passed through the delay line 105, through the transmission gate 106 and through the "or" gate 107 to the coarse counter 108. This counter counts the coarse pulses A, and this count continues as long as the transmission gate 106 is open.

During what may be termed "normal" operation of the system, the transmission gate 106 is closed by the stop pulse B. The stop pulse is applied to the bi-stable generator 115 through the delay line 125, and the resulting output pulse from the bi-stable generator passes through the "or" gate 110 to close the transmission gate 106. The transmission gate 106 is held closed until the next start pulse A resets the bi-stable generator 115.

Then, if there is still an interval to be measured, the vernier oscillator 112, which as in the system of FIGURE 1, is activated by the stop pulse B, generates the vernier pulses D on the lead 131. These latter pulses are counted by the vernier counter 127 until coincidence is achieved between the coarse pulses and the vernier pulses. When that occurs, the "and" gate 114 generates the "inhibit" pulse F. This pulse stops both the vernier oscillator 122 and the coarse oscillator 100.

It will now be assumed that the time interval to be measured by the system of FIGURE 3 is almost, but not exactly, an exact multiple of a microsecond, say 10.01 microseconds. Under these conditions, and without the control means of the present invention, the transmission gate 106 might or might not pass the tenth coarse pulse. In the system of FIGURE 3, however, the pulse shaper 126 and the "and" gate 120 are activated to overcome this ambiguous condition. If, for example, the vernier time interval to be measured is within .20 microsecond of an integral number of microseconds, a control pulse is routed in the system of the invention through the "or" gate 110 from the "and" gate 120. This pulse serves to close the transmission gate 106, so that the transmission gate does not pass the questionable tenth pulse. This control pulse is derived from a selected one of the coarse pulses C on the lead 130 after they have been passed through the delay line 104. The selected pulse is passed by the "and" gate 120 to the "or" gate 110. This action occurs, however, only when the stop pulse B from the pulse shaper 126 has a particular time relationship with the selected pulse from the delay line 104. This relationship in the example under consideration, is such that the "and" gate 120 passes the pulse from the pulse shaper 126 to the transmission gate 106 only when the selected coarse pulse from the delay line 104 is, for example, within .20 microsecond of the pulse from the pulse shaper 126. When that condition occurs, the delay line 104 causes the corresponding pulse from the delay line 104 to occur in time coincidence with the pulse from the pulse shaper 126, so that the "and" gate 120 is enabled, and the questionable tenth pulse is eliminated.

Although the questionable pulse is eliminated under the conditions described above, the fact must be determined as to whether or not the elimination of the questionable pulse was a correct choice.

To test the correctness of the decision to eliminate the questionable tenth pulse under the above described conditions, the gate generator 116 is triggered on for a period of approximately 40 microseconds. The gate generator 116 is so triggered, for example, by the same pulse passed by the "and" gate 120 to the "or" gate 110. The gate generator 116 enables the "and" gate 111. If an inhibit pulse from the gate 114 occurs when the gate generator 116 is enabled, it means that the time interval to be measured extends beyond the tenth pulse. It then becomes certain that the elimination of the tenth pulse was in error, and a second pulse is fed to the "or" gate 107 to change the count of the counter 108 from 9 to 10 to provide the necessary correction.

Assume now that the time interval to be measured is 9.99 microseconds. Again, the system described above operates to assure that the tenth coarse pulse is not passed by the gate 106. However, under the latter conditions, the gate 111 is closed at the occurrence of the inhibit pulse. This indicates that the elimination of the tenth coarse pulse was correct, and no change is made to the coarse counter 108.

The ambiguity inherent in the type of system under consideration is resolved in the system of FIGURE 3 in the described manner. That is, if the stop pulse is within about ±.2 microsecond, for example, of a coarse pulse occurrence, the coarse count is cut short by one count on the assumption that the last coarse pulse is not needed. It is then necessary to test the decision to determine whether or not it was correct. This is done by noting the length of the vernier count. If the count is short, the stop pulse was actually beyond the coarse pulse in question, and the decision to cut short the coarse count was incorrect. In that case, it was merely necessary to add one more coarse pulse, in the described manner. If the vernier count is long, the stop pulse was ahead of the coarse pulse and the decision to reject one coarse pulse was correct. In the latter case, no additional coarse pulse is added.

As noted above, the system of FIGURE 4 is a refined version of the system of FIGURE 3. The coarse oscillator in the system of FIGURE 4 includes an amplifier 200 having an inhibit gate 202 coupled to its input circuit. The output circuit of the amplifier 200 is coupled to an "or" gate 204, which in turn, is coupled to a two-stage pulse amplifier 206. The output of the pulse amplifier 206 is coupled through a delay line 208 back to the input of the inhibit gate 202. The delay exhibited by the delay line 208 may, for example, be 1 microsecond.

Figure 4:
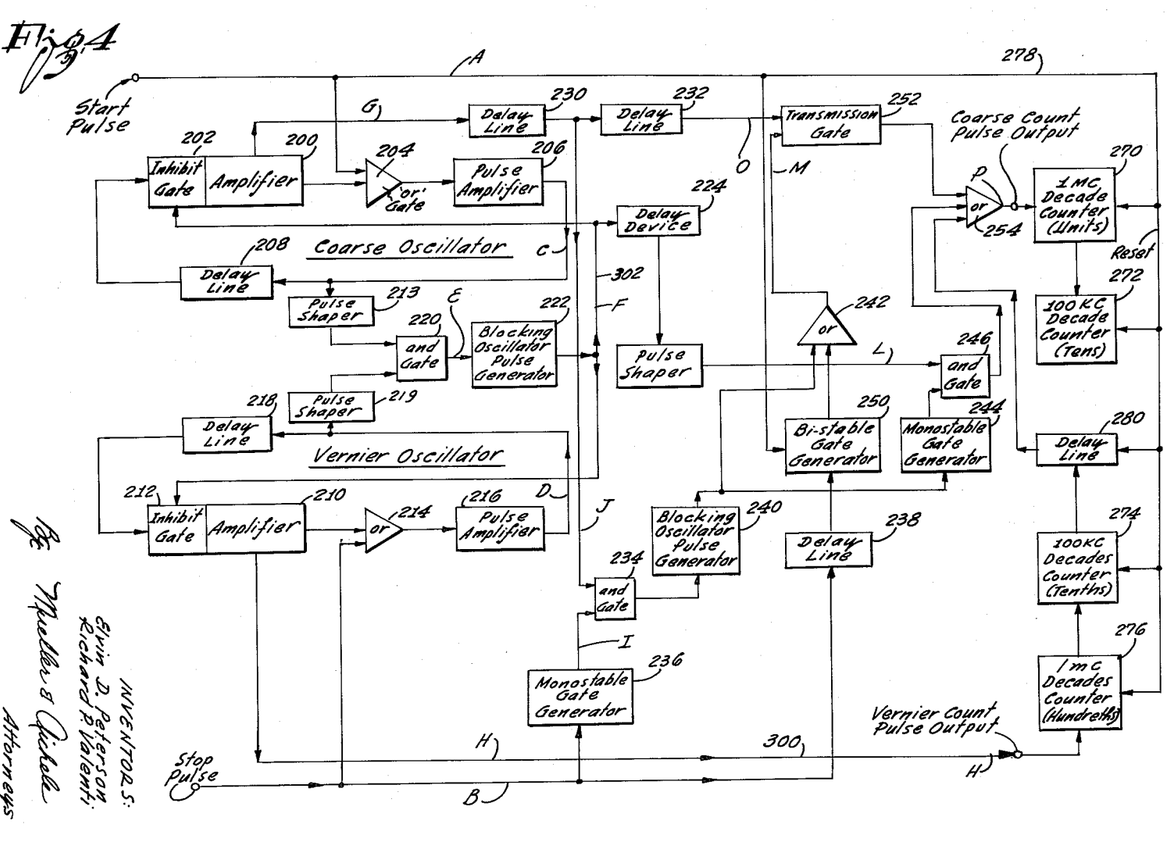
FIGURE 4 is a more refined representation of the system of FIGURE 3.

The vernier oscillator in FIGURE 4 includes an amplifier 210 having an inhibit gate 212 coupled to its input circuit. The output of the amplifier 210 is coupled through an "or" gate 214 to a two-stage pulse amplifier 216. The pulse amplifier 216 is coupled back through a delay line 218 to the input of the inhibit gate 212. The delay line 218 may exhibit at delay of .99 microsecond, for example. The start pulse is introduced to the "or" gate 204, and the stop pulse is introduced to the "or" gate 214.

The pulse amplifier 206 and the pulse amplifier 216 are coupled through respective pulse shapers 213 and 219 to an "and" gate 220. The output of the "and" gate 220 is coupled to a blocking oscillator 222. The output of the blocking oscillator 222 is introduced to the inhibit gate 202 and to the inhibit gate 212. This output is also introduced through a delay device 224 to a pulse shaper 226. The delay device 224 may exhibit a delay, for example, of 1 microsecond. The delay device 224 is inserted to compensate for the rise time of the generator 244.

The output from the amplifier 200 is applied to a delay line 230 which exhibits a delay, for example, of .2 microseconds. The output of the delay line 230 is applied to a delay 232 and to an "and" gate 234. The delay line 232 may also exhibit a delay of .2 microseconds.

The stop pulse is also introduced to a monostable gate generator 236 and to a delay line 238. The delay line may exhibit a delay of .4 microsecond. The output from the gate generator 236 is applied to the "and" gate 234, and the output from the "and" gate is used to trigger a blocking oscillator pulse generator 240. This gate pulse is applied to an "or" gate 242, and to a monostable gate generator 244. The delay line 238 is also connected to a bistable gate generator 250, the output of which is connected to the "or" gate 242. The "start" pulse A is also applied to the bistable generator 250 to reset the generator. The output from the pulse shaper 226 and the output from the monostable gate generator 244 are both introduced to an "and" gate 246. The output signal from the pulse generator 240 may be in the form of a 40 microsecond gate pulse, for example.

The bi-stable generator 250 is set to a first of its stable states by the start pulse, and the generator enables a transmission gate 252 when it is in its first state. The output from the "or" gate 242 disables the transmission gate 252 when the generator is in its second stable state. The "and" gate 246 and the "and" gate 252 are both connected to an "or" gate 254. The output from the "or" gate 254 constitutes the coarse count pulse output, and the output from the amplifier 210 constitutes the vernier count pulse output.

The transmission gate 252 and the "and" gate 246 are coupled through the "or" gate 254 to a 1 megacycle decade counter 270. This counter counts in "units," and it is coupled to a 100 kilocycle decade counter 272. The latter counter counts "tens."

A 100 kilocycle decade counter 274, which counts tenths, is provided; and a 1 megacycle decade counter 276, which counts hundredths, is also provided. These counters 270, 272, 274 and 276 are reset by the "start" pulse A which is introduced to them over the lead 278. The decade counter 274 is coupled through a delay line 280, and through the "or" gate 254, to the decade counter 270.

In usual manner, when the decade counter 270 counts to ten, it causes the decade counter 272 to step one step. Likewise, when the decade counter 276 reaches ten, it causes the decade counter 274 to move one step.

The vernier pulses from the amplifier 210 are introduced over the lead 300 to the decade counter 276. The coarse pulses are applied to the counter 270, as described, and the counters 270 and 272 count these pulses. The vernier pulses, on the other hand, are counted by the counters 274 and 276.

If due to a slight misadjustment of the oscillator frequencies, the vernier oscillator were to generate, for example, 100 pulses when it should have produced, for example, 99 pulses; a gross error of 1 microsecond would occur if a "1" count were not added to the unit counter 270. This addition is accomplished in the system of FIGURE 4 by taking the output of the counter 274 and feeding that output through the delay line 280 and through the "or" gate 254 to the unit counter 270.

When the system of FIGURE 4 is operating in a region which does not require the anti-ambiguity control, a received start pulse is introduced through the "or" gate 204 to the pulse amplifier 206, and this pulse circulates through the coarse oscillator system so that a series of pulses G (FIGURE 5) are applied to the delay line 230. These pulses are delayed in the delay line 230 and in the delay line 232, and they pass through the "transmission" gate 252 and through the "or" gate 254 to the coarse count decade counters 270 and 272. The "and" gate 252 is enabled, because the start pulse sets the bistable generator 250 in its true state.

The count by the coarse decade counters 270 and 272 continues until the stop pulse is received. The stop pulse is introduced through the "or" gate 214 to the pulse amplifier 216 in the vernier oscillator, and it circulates around the vernier oscillator so that the amplifier 210 develops a series of vernier pulses H (FIGURE 5) on the lead 300. The stop pulse also is passed through the delay line 238 to set the bi-stable generator 250. This immediately disables the transmission gate 252, through the "or" gate 242, to continue the feed of coarse oscillator pulses to the coarse decade counters 270 and 272. The vernier pulses on the lead 300 are now counted by the vernier decade counters, and this counting continues until coincidence occurs. Such coincidence causes the "and" gate 220 output pulse E to trigger the blocking oscillator inhibit pulse generator 222, so that the generator develops the signal F (FIGURE 5) on the lead 302. The signal F is applied to the inhibit gates 202 and 212 to terminate the generation of pulses by the coarse oscillator and the vernier oscillator. At this time, the coarse decade count represents the unit count in the system, and the vernier decade count represents the fractional count.

Assume now that a time interval reading of 3.10 microseconds is to be made. For this case, the stop pulse B (FIGURE 5) occurs within the region of uncertainty, this region being assumed to be within ±.2 of a microsecond of a coarse pulse occurrence. The decision-making circuits then go into operation to determine what the coarse count shall be. Due to the closeness of the stop pulse B and the delayed coarse pulses J from the delay line 230, the gate pulse I from the monostable gate generator 236 causes the next coarse pulse J to pass through the "and" gate 234 to the blocking oscillator pulse generator 240, so that the resulting pulse from the generator 240 passes through the "or" gate 242 to the transmission gate 252 to terminate the introduction of coarse oscillator pulses to the counters 270 and 272. In the particular example, the coarse count is limited, therefore, to 2 pulses.

Figure 5:
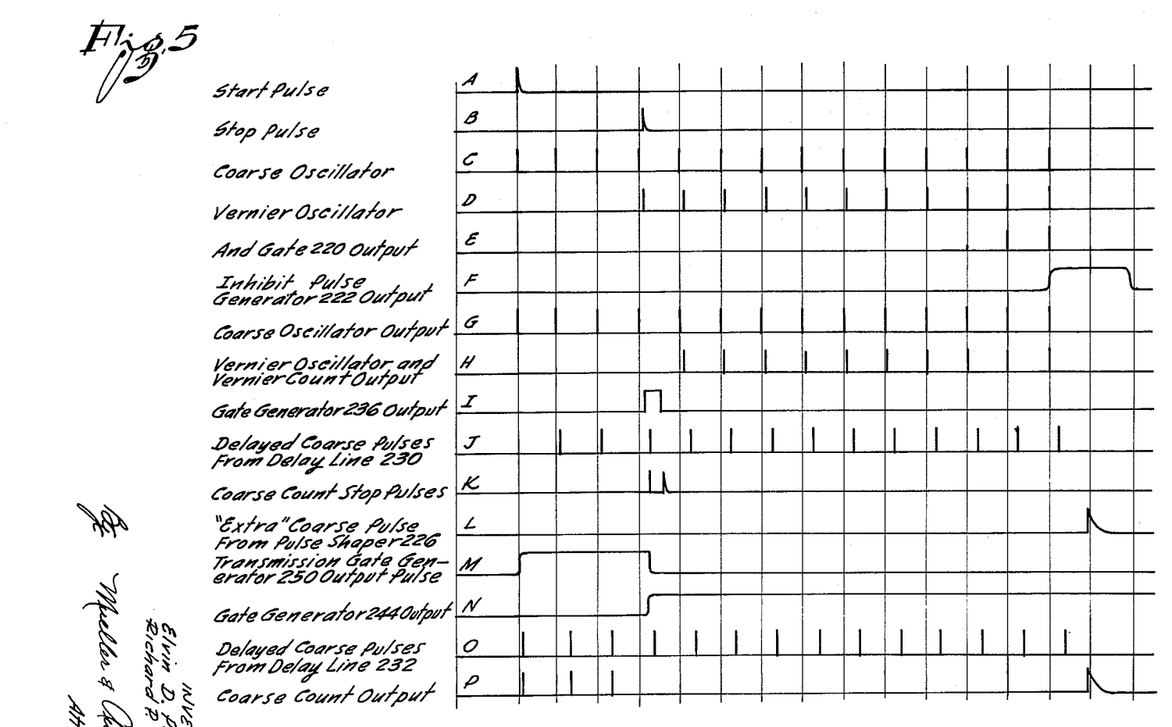
FIGURE 5 is a series of curves useful in explaining the operation of the system of FIGURE 1.

The validity of the decision is now tested by causing the pulse from the blocking oscillator pulse generator 240 to trigger the monostable gate generator 244 so that the latter produces the wave form N in FIGURE 5. The inhibit pulse from the generator 222, which is shown in the curve F, is applied through the delay device 224 and through the pulse shaper 226 to the "and" gate 246. The resulting pulse from the pulse shaper 226 is the "extra" coarse pulse, as shown in the curve L of FIGURE 5. This pulse is passed to the coarse count decade counters 270 and 272, providing that the signal N from the monostable gate generator 244 occurs at the proper time with respect to the pulse L to enable that gate. In the case under consideration, the extra coarse pulse L falls within the 40 microsecond period of the gate N, and an extra pulse is gated through to the unit counter 270 because the coarse count should be 3.

If the stop pulse is not within ±0.2 microsecond of a coarse pulse, the bi-stable gate generator 250 is set by the delayed stop pulse, as described above, and the gate 246 is not enabled to pass the extra coarse pulse L, this because the "and" gate 234 is not enabled to permit the blocking oscillator pulse generator 240 to be triggered. This is the proper action, because the decision made under these circumstances does not require testing.

In a case in which the stop pulse occurs just ahead of the coarse oscillator pulse, and yet in which the coarse oscillator pulse falls within ±.2 microsecond of the stop pulse, the inhibit pulse 222 will occur after the "and" gate 246 is disabled, so that no extra pulse is added, which is proper in this case.

It should be noted that the operation of the logic circuitry of FIGURE 4 is digital in nature and does not depend on the accuracy of the delays exhibited by the delay lines, or to the characteristics of the gates or shaper circuit. To preserve the accuracy of the circuit, it is only necessary to preserve the accuracy of the original start and stop pulses through the point of coincidence of the coarse and vernier oscillators. This means that all the circuitry, with the possible exception of the components of the coarse and vernier oscillators, and the "and" gate 220 and inhibit gate generator 222 can be non-critical with respect to timing accuracy.

It is interesting to note that no region of ambiguity can exist for "partial coincidence" at the edge of the gate signal from the monostable gate generator 236 so long as the monostable gate generator 244 is never triggered on when the bi-stable gate generator 250 is reset. If this condition holds, it makes no difference in the final count if the gate generator 250 is triggered off and the gate generator 244 is triggered on with the first pulse from the "or" gate 242, or if the generator 250 is set false by the second pulse and the gate generator 244 is never activated. The purpose of the blocking oscillator generator 240 is to insure that both the gate generators 244 and 250 are triggered at once or not triggered at all. This same line of reasoning applies to all other regions of uncertainty, and this results in an extremely stable system.

The outputs of the coarse and vernier oscillators in the system of FIGURE 4 will never have less than one output pulse present from the amplifiers 206 and 216 for any particular measurement. Even at 00.00 microsecond, a pulse from each amplifier is required to cause the "and" gate 220 to develop an inhibit pulse E. The delay of the delay lines 208 and 218 permits the inhibit pulse E to shut off the inhibit gates 202 and 212 before the amplifiers 200 and 210 receive the pulses which caused the coincidence. Therefore, for a 00.00 microsecond measurement, no pulses are developed by the amplifiers 200 and 210.

As is evident from the curves of FIGURES 2 and 5, the number of hundredths (assuming that $n=100$) is the number of vernier pulses less one. Also, the actual coarse count is the total number of coarse pulses less 1. As noted above, the necessary subtraction of one vernier pulse is accomplished simply by counting the vernier pulses at the output end of the vernier oscillator delay line and by checking for coincidence at the input end. In this manner, the vernier pulse that actually causes coincidence is not counted since the inhibit gate prevents it from coming through to the amplifiers. For the same reason, the coarse count is likewise taken at the output end of its oscillator delay line.

The invention provides, therefore, an improved interval measuring system of the coarse count and vernier count type, and in which ambiguities are overcome, so that the system functions to provide precise and accurate counts through all conditions.

The system of the invention is further advantageous in that it is constructed, as described, so that the components themselves need not be precisely constructed to an excessive extent, and they need not operate within any degree of unreasonable tolerances. This results in a large measure of simplification as compared with the prior art systems, and a saving in cost and size. It will be noted that the components themselves, are composed of usual and available logic circuitry and electronic circuit components, so that the system may be readily constructed in a straightforward and inexpensive manner.

What is claimed is:

1. A system for measuring the time interval between a first pulse and a second pulse including in combination: a source for producing a series of pulses of a predetermined repetition frequency, means responsive to said first pulse and coupled to said source for initiating the production of said series of pulses by said source, counter means, circuit means coupling said source to said counter means for introducing pulses of said series thereto and including gate means for terminating the introduction of the pulses of said series to said counter means, first control circuit means coupled to said gate means and responsive to said second pulse for actuating said gate means to terminate the introduction of the pulses of said series to said counter means, second control circuit means coupled to said gate means and adapted to receive said second pulse, and means coupling said source to said second control circuit means for supplying said series of pulses thereto, said second control circuit means being responsive to said series of pulses and to said second pulse to actuate said gate means prior to the actuation thereof by said first control circuit means in response to a second pulse which occurs within a predetermined time interval relative to any one of the pulses of said series.

2. A system for measuring the time interval between a first pulse and a second pulse including in combination: a source for producing a series of pulses of a predetermined repetition frequency, means responsive to said first pulse and coupled to said source for initiating the production of said series of pulses by said source, counter means, circuit means coupling said source to said counter means for introducing pulses of said series thereto and including gate means for terminating the introduction of the pulses of said series to said counter means, a first control circuit coupled to said gate means and responsive to said second pulse for actuating said gate means to terminate the introduction thereby of the pulses of said series to said counter means, a second control circuit coupled to said gate means and adapted to receive said second pulse, and means coupling said source to said second control circuit for supplying said series of pulses thereto, said second control circuit being responsive to said series of pulses and to said second pulse to actuate said gate means prior to the actuation thereof by said first control circuit in response to a second pulse which occurs within a predetermined time interval of any one of the pulses of said series to cause the introduction of the pulses of said series to said counter means to be terminated by said gate means just prior to the introduction of such one of the pulses to said gate means.

3. A system for measuring the time interval between a first pulse and a second pulse including in combination: a source for producing a series of pulses of a predetermined repetition frequency, means responsive to said first pulse and coupled to said source for initiating the production of said series of pulses by said source, counter means, circuit means coupling said source to said counter means for introducing pulses of said series thereto and including gate means for terminating the introduction of the pulses of said series to said counter means, first delay means interposed in said circuit means between said source and said gate means to delay the application of the pulses of said series to said gate means, first control circuit means coupled to said gate means and responsive to said second pulse for actuating said gate means to terminate the introduction thereby of the pulses of said first series to said counter means, second delay means included in said first control circuit means to delay the actuation of said gate means thereby by an amount corresponding to the delay imparted to the pulses of said series by said first delay means, second control circuit means coupled to said gate means and adapted to receive said second pulse, and means coupling said source to said second control circuit means for supplying said series of pulses thereto, said second control circuit means being responsive to said series of pulses and to said second pulse for actuating said gate means prior to the actuation thereof by said first control circuit means in response to a second pulse which occurs within a predetermined time interval relative to any one of said pulses of said series to cause the introduction of the pulses of said series to said counter means to be terminated by said gate means just prior to the introduction of such one of said pulses of said series to said gate means.

4. A system for measuring the time interval between a start pulse and a stop pulse including in combination: a source for producing a series of coarse pulses of a predetermined repetition frequency, means responsive to said start pulse and coupled to said source for initiating the production of said series of coarse pulses by said source, unit counter means, circuit means coupling said source to said counter means for introducing said coarse pulses thereto and including gate means for terminating the introduction of said coarse pulses to said unit counter means, first delay means interposed in said circuit means between said source and said gate means to delay the application of said coarse pulses to said gate means, a first control circuit coupled to said gate means and responsive to said stop pulse for actuating said gate means to terminate the introduction thereby of said coarse pulses to said counter means, second delay means included in said first control circuit to delay the actuation of said gate means thereby by an amount corresponding to the delay imparted to said coarse pulses by said first delay means, a second control circuit coupled to said gate means and adapted to receive said stop pulse, and means coupling said source to said second control circuit for supplying said series of pulses thereto, said second control circuit being responsive to said series of pulses and to said stop pulse for actuating said gate means prior to the actuation thereof by said first control circuit in response to a stop pulse which occurs within a predetermined time interval relative to any one of said coarse pulses of said series from said source to cause the introduction of said coarse pulses to said counter means to be terminating by said gate means just prior to the introduction of such one of said coarse pulses to said gate means.

5. The system defined in claim 4 and in which said gate means includes an "and" gate, a bi-stable generator coupled to said "and" gate and having a first state in which said "and" gate is enabled and a second state in which said "and" gate is disabled, means for introducing said start pulse to said bistable generator to actuate said bi-stable generator to its first state, and means for introducing said stop pulse to said bi-stable generator to actuate said bi-stable generator to its second state.

6. The combination defined in claim 4 and in which said second control circuit includes an "and" gate, a monostable gate generator coupled to said "and" gate for enabling said "and" gate in response to said stop pulse and for said predetermined interval, and means coupled to said circuit means for introducing said coarse pulses to said "and" gate to be passed thereby only during said predetermined time interval.

7. A system for measuring the time interval between a start pulse and a stop pulse including in combination: a first source for producing a series of coarse pulses of a first repetition frequency, means responsive to said start pulse and coupled to said first source for initiating the production of said series of coarse pulses by said first source, unit counter means, circuit means coupling said first source to said counter means for introducing said coarse pulses thereto and including gate means for terminating the introduction of said coarse pulses to said unit counter means, a second source for producing a series of vernier pulses of a second repetition frequency having a predetermined relationship with said first repetition frequency, means responsive to said stop pulse and coupled to said second source for initiating the production thereby of said series of vernier pulses, a first control circuit coupled to said gate means and responsive to said stop pulse for producing an output pulse for actuating said gate means so as to terminate the introduction of said coarse pulses to said unit counter means, a second control circuit coupled to said gate means and adapted to receive said stop pulse, means coupling said first source to said second control circuit for supplying said series of coarse pulses thereto, said control circuit being responsive to said series of coarse pulses and to said stop pulse for producing an output pulse for actuating said gate means prior to the actuation thereof by the output pulse from said first control circuit in response to a stop pulse which occurs within a predetermined time interval relative to any one of said coarse pulses of said series from said first source so as to terminate the introduction of said coarse pulses to said unit counter just prior to the introduction of such one of said coarse pulses to said gate means, coincidence means coupled to said first and second sources for developing a coincidence output pulse upon time coincidence between any one of said coarse pulses and a corresponding one of said vernier pulses, and a third control circuit coupled to said coincidence means and to said second control circuit for introducing an additional pulse to said unit counter means when the occurrence of said coincidence output pulse follows the output pulse from said second control circuit.

8. The combination defined in claim 7 and which includes fractional counter means coupled to said second source, and means coupled to said coincidence means for introducing said coincidence output pulse to said second source to terminate the production thereby of said series of vernier pulses.

9. The combination defined in claim 8 and which includes means for coupling said fractional counter means to said unit counter means to actuate said unit counter means upon a full count being established in said fractional counter means.

10. The combination defined in claim 7 and in which said first source and said second source each includes an inhibit gate, a first amplifier, an "or" gate, a second amplifier and a delay line coupled in that order in a circulating loop.

11. The combination defined in claim 7 and in which said first source includes an inhibit gate, a first amplifier, an "or" gate, a second amplifier and a delay line coupled in that order in a circulating loop, means for introducing said start pulse to said "or" gate, means for introducing said coincidence output pulse from said coincidence means to said inhibit gate, means for introducing the output from said first amplifier to said circuit means, and means for introducing the output from said second amplifier to said coincidence means.

12. The combination defined in claim 8 and in which said second source includes an inhibit gate, a first amplifier, an "or" gate, a second amplier and a delay line coupled in that order in a circulating loop, means for introducing said stop pulse to said "or" gate, means for introducing the output from said first amplifier to said fractional counter means, means for introducing said coincidence output pulse from said coincidence means to said inhibit gate, and means for introducing the output from said second amplifier to said coincidence means.

References Cited by the Examiner
UNITED STATES PATENTS

| | | | |
|---|---|---|---|
| 2,665,410 | 1/1954 | Burbeck | 324—68 |
| 2,831,162 | 4/1958 | Gross | 324—68 |
| 3,037,166 | 5/1962 | Alexander | 324—68 |

WALTER L. CARLSON, *Primary Examiner.*

SAMUEL BERNSTEIN, *Examiner.*